United States Patent
Kimura et al.

[11] Patent Number: 5,433,489
[45] Date of Patent: Jul. 18, 1995

[54] PIPE FITTING

[75] Inventors: Yasuhito Kimura; Masaaki Muto, both of Soka, Japan

[73] Assignee: SMC Corporation, Tokyo, Japan

[21] Appl. No.: 284,046

[22] Filed: Aug. 1, 1994

Related U.S. Application Data

[63] Continuation of Ser. No. 777,536, filed as PCT/JP91/00485, Apr. 12, 1991, abandoned.

[30] Foreign Application Priority Data

Apr. 16, 1990 [JP]  Japan ................................. 2-99922

[51] Int. Cl.⁶ .................................................. F16L 5/02
[52] U.S. Cl. .................................. 285/220; 285/332.3
[58] Field of Search ................. 285/212, 220, 332.3, 285/332.2

[56] References Cited

U.S. PATENT DOCUMENTS

| | | | |
|---|---|---|---|
| 3,160,427 | 12/1964 | Natho | 285/332.3 X |
| 3,489,438 | 1/1970 | McClure | 285/332.2 X |
| 4,209,193 | 6/1980 | Ahlstone | 285/332.3 X |
| 4,280,721 | 7/1981 | Norkon | 285/212 X |
| 4,531,767 | 7/1985 | Andreolla | |
| 4,770,448 | 9/1988 | Strickland et al. | |
| 4,934,742 | 6/1990 | Williamson | 285/220 X |
| 5,165,731 | 11/1992 | Kimuta | 285/220 |

FOREIGN PATENT DOCUMENTS

| | | |
|---|---|---|
| 22293 | 6/1980 | European Pat. Off. . |
| 0152617 | 8/1985 | European Pat. Off. . |
| 0370641 | 5/1990 | European Pat. Off. . |
| 56-24279 | 3/1981 | Japan . |
| 59-172885 | 11/1984 | Japan . |

*Primary Examiner*—Dave W. Arola
*Attorney, Agent, or Firm*—Oblon, Spivak, McClelland, Maier, & Neustadt

[57] ABSTRACT

A pipe fitting for use with fluid-holding apparatuses has a thread that matches any of several different types of pipe threads of the same diameter. Imperfect sealing is eliminated by simple means by taking advantage of a small chamfered area that is provided at the outer end of an internally threaded bore. An external thread matching several different types of internal pipe threads of the same diameter has a flared surface tapered at an angle of approximately 90 degrees at its base. A sealing member to seal the clearance between the pipe fitting and the internal thread in the fluid-holding apparatus provided at a point corresponding to the chamfered area that is positioned slightly outside the periphery of the outermost root of the internal thread cut in its outer end.

2 Claims, 3 Drawing Sheets

PIPE FITTING

This application is a continuation of application Ser. No. 07/777,536, filed Dec. 9, 1991, abandoned, which was filed as International Application No. PCT/JP91/00485 on Apr. 21, 1991.

FIELD OF THE INVENTION

This invention relates to pipe fittings screwed into threaded pipes used with fluid-holding apparatuses and more particularly to pipe fitting sealing means with external threads adapted to engage with several types of internal threads of the same nominal diameter used as pipe threads.

DESCRIPTION OF THE PRIOR ART

Several different types of inch-based pipe threads for pneumatic piping have been known. Tape red pipe threads R, Rc and Rp and parallel threads G according to the ISO and JIS standards and American Standards tapered pipe threads NPT and hermetic tapered pipe threads NPTF according to the ANSI standard are typical examples. A tapered external pipe thread R engages with a tapered internal pipe thread Rc or a parallel internal thread Rp. A parallel external pipe thread G engages with a parallel internal pipe thread G. An American Standards tapered external pipe thread NPT engages with its counterpart internal pipe thread NPT. An American Standards hermetic tapered external thread NPTF engages with its counter part internal pipe thread NPTF. All these combinations provide mechanical connection, hermetic seal and other desired effects.

But the conventional threads have their own disadvantages. Even if classified under the same nominal diameter category, for example, threads of different types differ in thread pitch, major diameter, effective diameter, minor diameter, thread angle, roundness of crest and root and other thread-profile defining parameters. Also, they employ different sealing methods. As such, some threads do not engage with other types of threads, or, even if engaged, do not provide high enough hermetic seal.

To permit using different types of pipe threads together, therefore, as many pipe fittings as the types of pipe threads involved must be prepared for each nominal diameter. But this solution, which employs many different types of pipe fittings, not only increases the storage cost of their manufacturers and users but also involves tile risk causing defective sealing or other troubles through misuse.

The engaging length of pipe fittings with tapered threads with a fluid-holding apparatus may vary when the dimensional tolerances of their profile and their reference points, which varies with the type of thread-cutting machines employed, vary. Similar variation occurs even with the same fitting when it is tightened in different numbers of turns. To secure safe enough hermetic seal, therefore, the portion of the conventional pipe fittings is made longer than is otherwise necessary. This margin results in increased cost, fitting difficulties in limited spaces and increased screwing time and labor. They also require troublesome sealing.

As a solution for the above problem, the inventors proposed (Japanese Provisional Patent Publication No. 276987 of 1978) pipe fittings having an external thread (hereinafter called the multipurpose external pipe thread) that engages with several different types of internal pipe threads of the same nominal diameter.

But the pipe fittings with multipurpose external pipe threads have created a new problem of imperfect sealing as they are used with many different types of fluid-holding apparatuses. As shown in FIG. 5A, a pipe fitting of the previously proposed type just mentioned is sealed by pressing a sealing member 3 in a sealing groove provided in the neck of the external thread 1 cut thereon against the outer end 4a of an internally threaded hole 4 in a fluid-holding apparatus. But the sealing thus made tends to prove imperfect because of the internal thread that is cut as far as tile outer end 4a of the hole.

Sealing may also be made by employing the surface 2a of the fluid-holding apparatus 2 as a bearing surface. But the surface 2a is not always flat. Even when it is flat, it may have too many abrasions or other surface defects to serve as a bearing surface.

Furthermore, no thread standards specify the size of chamfering at the outer end 4a of the internally threaded hole 4. As a consequence, tile shape of the outer end 4a varies greatly among different apparatuses. When the outer end 4a is chamfered overly and the externally threaded member 1 has a large nut portion 1a that is gripped by a spanner, as shown in FIG. 5B, the sealing surface 1b and the sealing member 3 may disengage from the outer end 4a of the internally threaded hole, thereby breaking the once established sealing.

SUMMARY OF THE INVENTION

A main object of this invention is to eliminate imperfect sealing of pipe fittings with multipurpose external pipe threads by use of simple means.

Another object of this invention is to provide a surer seal by use of a sealing member provided on a tape red surface at tile base of a multipurpose external pipe thread at a point slightly outside the periphery of tire root of the internal thread in the outer end thereof by taking advantage of a chamfered portion that is commonly provided thereat.

Still another object of this invention is to provide a pipe fitting that secures a sure seal even when the area of chamfering on the internally threaded side varies by tapering the base of the multipurpose external pipe thread where the sealing member is provided.

In order to achieve the above objects, a pipe fitting according to this invention has an external pipe thread matching a corresponding internal pipe thread cut in a fluid-holding apparatus, and the external pipe thread is designed to fit various types of internal pipe threads of the same nominal diameter, with the axial length thereof being made as short as possible within the limit in which the desired mechanical connection can be obtained. The external pipe thread has at its base a flared surface tapered at an angle of approximately 90 degrees, and a sealing member to establish a seal between the external and internal threads is provided on the tapered flared surface at a point slightly outside the periphery of the outermost root in the outer end of the internal pipe thread.

Because of the external pipe thread just described, this type of pipe fitting can be used with various types of internal pipe threads of the same nominal diameter.

Conventional pipe fittings used with many different types of fluid-holding apparatuses may not always provide a perfect seal. But that is not the case with the pipe fitting of this invention that always provide a perfect:

seal by taking advantage of a chamfered portion that is commonly provided at the outer end of the internal thread.

The axial length of the external thread that is reduced to a minimum within the limit necessary for the securing of adequate mechanical connection permits lowering the cost thereof and facilitates the screwing thereof into fluid-holding apparatus.

DESCRIPTION OF THE PREFERRED EMBODIMENTS

Before describing the preferred embodiments of this invention, art example of a multipurpose external pipe thread that screws into any of the tapered internal pipe thread Rc, parallel internal pipe thread G, American standards tapered pipe thread NPT and hermetic tapered pipe thread NPTF will be described.

Figure 4:
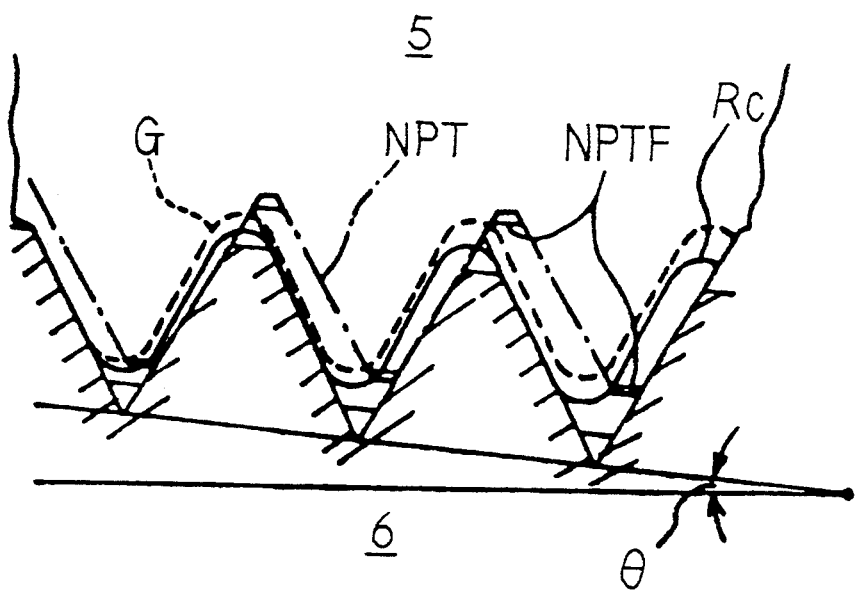
FIG. 4 schematically illustrates how a multipurpose pipe thread is established.
Figure 5A:
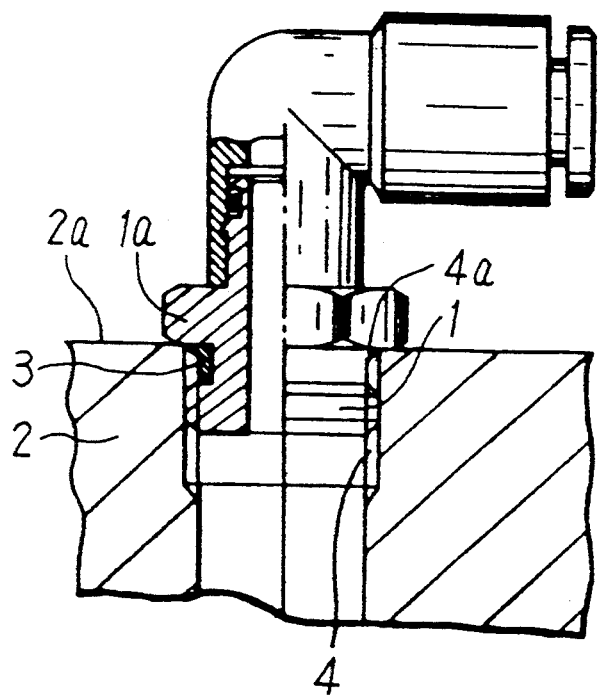
FIGS. 5A and 5B illustrate defective seals provided by a previously proposed pipe fitting.
Figure 5B:
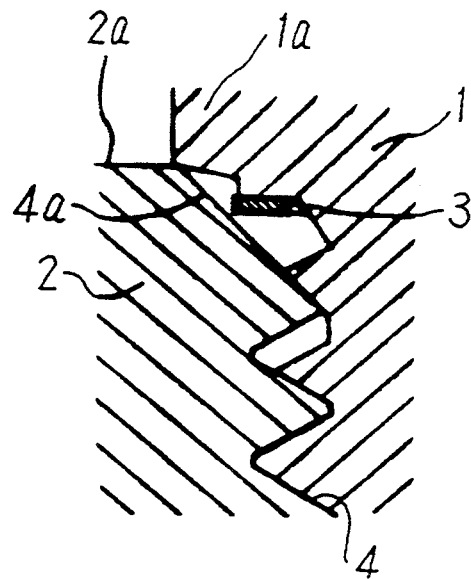

In FIG. 4, a thick solid line, a dotted line, a dot-dash line and a thin solid line respectively show the reference thread contour of the internal threads Rc, G, NPT and NPTF that are axially superposed so that the points indicating their reference diameter coincide with each other. Reference character $\theta$ shows art angle slightly larger than a half of the taper angle of the tapered threads. The dimensional tolerances of the reference thread contour of the individual threads are as specified in their corresponding standards. As is obvious from FIG. 4, the threads of the external thread 6 that screws into all of the four different types of internal pipe threads mentioned above must be on the inside of their threads.

The internal threads Rc and G have the same reference diameter, thread pitch, angle of thread, and rounded crest and root contours. They are different only in that the internal thread G is a parallel thread whereas the internal thread Rc is a tapered thread whose diameter becomes smaller in the direction in which it is screwed. Therefore, the threads of the internal thread G are always on the outside of those of the internal thread Rc. The internal threads NPT and NPTF have the same pitch angle, taper angle, angle and height of sharp V-thread, and effective diameter. But their major diameter and root diameter. The minimum diameter of NPTF is smaller than that of NPT but larger than that of Rc. The minimum root diameter of NPT is much smaller than that of NPTF. Therefore, NPT and NPTF can be used together if due consideration is given to the minimum root diameter of the NPT thread.

As such, the threads of he external thread 6 must be on the inside of the threads of the internal threads Rc and NPT. Sharp triangles defined by the ridge lines of the threads Rc arid NPT form a continuous range of mountains with a geometrically determined pitch and taper angle. Therefore, a multipurpose external pipe thread fitting the internal threads Rc, G, NPT and NPTF is obtained by deciding the height and contour of crest and root on the basis of their pitch, taper angle, and angle and height of sharp V-thread, plus the diameter and dimensional tolerance of the corresponding internal thread. The hatched area in FIG. 4 shows an example of an external thread thus established.

The thread contour of the external thread G may be chosen at random so long as the selected contour is on the inside of the thread contours of the internal threads Rc and NPT.

When a multipurpose external pipe thread thus designed is used with different types of internal pipe threads, the amount of engagement between the external and internal threads is smaller than in the case in which external and internal threads of the same type are used together. But this does not present any practical problem because the theoretical ratio of engagement between the external arid internal threads in the nominal diameter range of ⅛ to ½ inch popularly used with pneumatic pipe fittings is as high as 70 percent or above. Furthermore, it has been experimentally proved that the shear strength of pneumatic pipe fittings is usually more, than 30 times greater than the maximum service pressure in common use.

Figure 1:
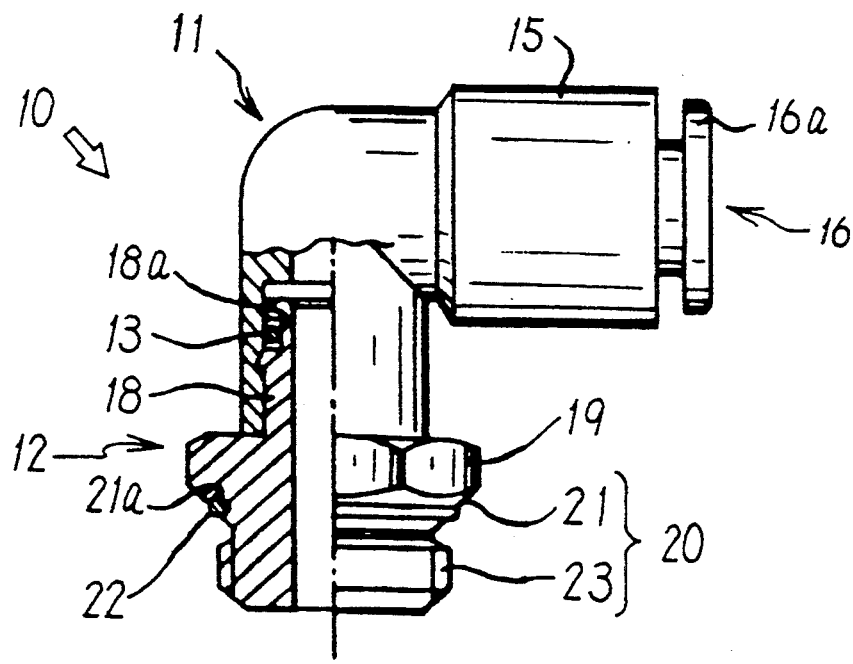
FIG. 1 is a front view of a preferred embodiment of this invention, with a principal portion thereof cut open.

FIG. 1 shows a preferred embodiment of this invention with a multipurpose external thread. A pipe fitting 10 comprises a fitting proper 11, a rotatable but unslidable half fitting 12 driven in the fitting proper 11, and an O-ring that seals the clearance between the fitting proper 11 and the driven half fitting 12.

The fitting proper 11 is art elbow with a one-touch coupling 16 which is positioned opposite to the driven half fitting 12 and comprises a sealing member (not shown), an engaging member that bites into the outer wall of a pipe to be connected and engages therewith (not shown), and a release member 16a that unfastens tine engaging member when pressed in, thereby allowing the disconnection of the pipe. But the shape of the pipe fitting of this invention is not limited to an elbow but may be of any design so long as pipes are connectable.

The driven half fitting 12 comprises a press-in section 18 that is pressed into the opening of the fitting proper 11, a nut section 19 that is adapted to be turned by a spanner or other turning tool, and a screw-in section 20 that is screwed into a fluid-holding apparatus. The screw-in section 20 has at its base end a tapered surface 21 that flares toward tile nut section 19. The tapered surface 21 can be considered as a surface of a cone having a center axis which coincides with the center axis of the fitting 12. Therefore, the tapered surface 21 flares toward the nut section 19 at an angle of approximately 90 degrees or 45 degrees relative to the center axis of the fitting 12. A multipurpose external pipe thread 23 is cut around tile lower end of the tapered surface 21. The axial length of the multipurpose external pipe thread 23 is reduced to a minimum within the limit necessary for the securing of strong enough mechanical connection to withstand the pneumatic pressure used in service. The preferable axial length is such that two to four threads can be cut there in.

The tapered surface 21 has an annular sealing groove 21a that is cut at a point slightly outside tile periphery of the root of the largest one of several different types of internal pipe threads matching with the multipurpose external pipe thread 23. A sealing member 22 to seal the clearance between the pipe fitting and tile threaded bore in a fluid-holding apparatus is provided in tile sealing groove 21a.

Because its thread length (i.e., the axial length of the screw-in section 20) is kept to a minimum, tile pipe fitting 10 is not costly, permits use in small spaces, and allows easy labor-efficient installation.

Figure 2A:
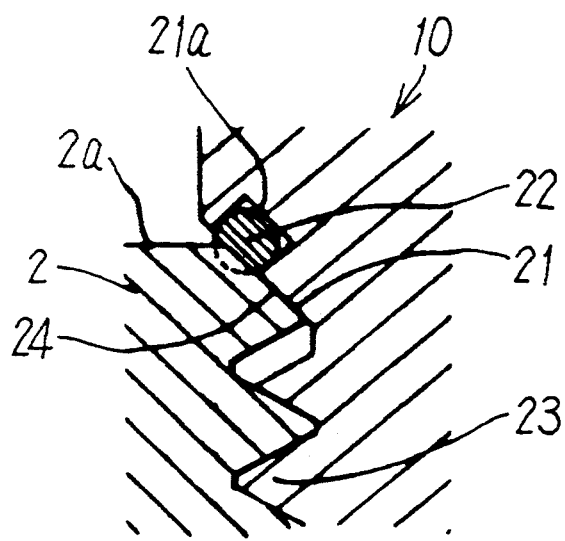
FIGS. 2A and 2B are partially enlarged views of seals provided thereby.
Figure 2B:
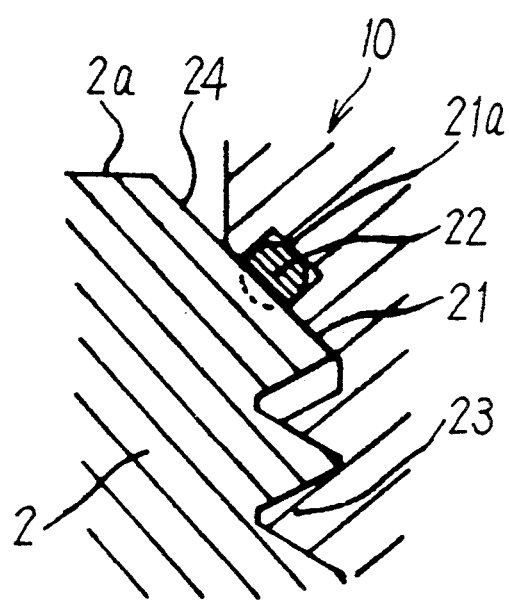

As stated above, the sealing member 22 is provided in the sealing groove 21a that is cut at a point slightly outside the periphery of the root of the largest one of several different types of internal pipe threads matching with the multipurpose external pipe thread 23. This always provides a sure seal, even when the chamfered area 24 is extremely small as shown in FIG. 2A or when the chamfered area 24 is large as shown in FIG. 2B. Being commonly provided afterward, in addition, the chamfered area 24 has fewer surface defects and dents than the surface 2a of the fluid-holding apparatus 2, thus very causing few sealing problems.

Because the external thread is on the inside of the innermost one of several different types of matching internal pipe threads, the diameter of the external thread is always smaller than that of the internal thread. Therefore, the surfaces of the external and internal threads remain out of contact when they are screwed together and remain unbroken even when they are tightened further, generating little abrasion and cutting powder that can cause malfunction of solenoid valves, cylinders and other parts of the fluid-holding apparatus.

Figure 3A:
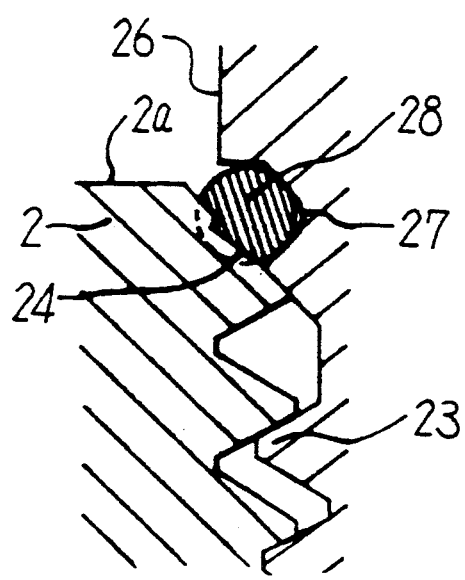
FIGS. 3A to 3C are partially enlarged views of seals provided by other preferred embodiments.
Figure 3B:
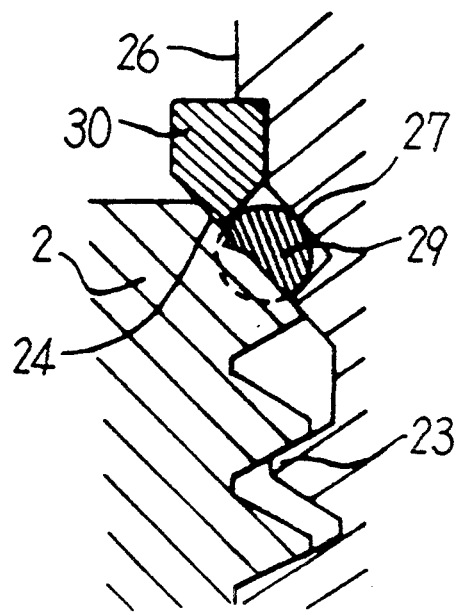
Figure 3C:
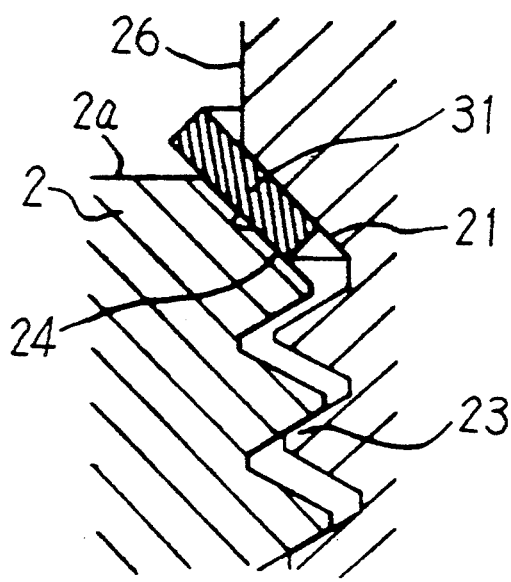

As is obvious from FIG. 1, the fitting proper 11 and driven half fitting 12, including the nut section 19 to be grasped by a spanner, has no portion that projects outward beyond the tapered surface 21, except the external thread and the sealing member. FIGS. 3A to 3C show sealing members that are fitted in the pipe fittings 10 whose nut section or the base 2B of the multipurpose external pipe thread 23 is smaller than the outermost crest of the internal thread 5 in diameter. In an embodiment shown in FIG. 3A, an annular sealing groove 27 to carry a sealing member 28 is provided between the nut section or the base 26 of the external thread and the multipurpose external pipe thread 23. If hard enough to resist deformation, the sealing member 28 remains intact in position even when fluid pressure works thereon.

FIG. 3B shows a sealing member 29 edged with an outer ring 30 of synthetic resin or metal that keeps the sealing member 29 from protruding outward. FIG. 3C shows a gasket 31 having a substantially rectangular cross section that serves as a sealing member between the chamfered area 24 and the tapered surface 21.

The other structure and function of these embodiments than those described above are similar to those of the one shown in FIG. 2. Therefore, similar parts thereof are designated by similar reference characters, and no detailed description is given thereabout.

What is claimed is:

1. A pipe fitting comprising:
    an external thread part adapted to screw in an internal pipe thread cut in a fluid-holding apparatus, an upper portion of said internal pipe thread of said fluid-holding apparatus comprising a chamfered surface which is tapered at an angle with respect to a center axis of said external thread part of said pipe fitting, the external thread part of said pipe fitting matching Rc, G, NPT and NPTF type internal threads of the same nominal diameter and having an axial length that is reduced to a minimum within a limit necessary for securing an adequate mechanical connection; and
    a flared surface tapered at an angle of approximately 45 degrees with respect to the center axis of the external thread part of said pipe fitting, said flared surface being located at a base of said external thread part and comprising annular sealing groove means which face said chamfered surface and receives a sealing member in said sealing groove means to seal a clearance between the pipe fitting and the internal pipe thread cut in the fluid holding apparatus, said sealing groove means comprising a seating surface which is spaced from said chamfered surface of said internal pipe thread, said seating surface being parallel to said chamfered surface of said internal pipe thread and parallel to said flared surface of said external thread part, said sealing member being seated on said seating surface of said sealing groove means, said annular sealing groove means of said flared surface being provided at a point slightly outside a periphery of an outermost root of the internal pipe thereof;
    wherein no portion of a main body of the pipe fitting other than the external thread part projects radially beyond the tapered flared surface.

2. The pipe fitting according to claim 1, wherein an O-ring is used as the sealing member.

* * * * *